(12) United States Patent
Levy et al.

(10) Patent No.: US 7,586,918 B2
(45) Date of Patent: Sep. 8, 2009

(54) LINK FRAGMENT INTERLEAVING WITH FRAGMENTATION PRECEDING QUEUING

(75) Inventors: Amir Levy, Kiryat Uno (IL); Yossi Argaman, Hod-Hashron (IL); Tali Itzhar, Raanana (IL)

(73) Assignee: Cisco Technology, Inc., San Jose, CA (US)

( * ) Notice: Subject to any disclaimer, the term of this patent is extended or adjusted under 35 U.S.C. 154(b) by 755 days.

(21) Appl. No.: 10/948,370

(22) Filed: Sep. 22, 2004

(65) Prior Publication Data

US 2006/0062224 A1 Mar. 23, 2006

(51) Int. Cl.
*H04L 12/28* (2006.01)
(52) U.S. Cl. .................. 370/395.1; 370/473
(58) Field of Classification Search .......... None
See application file for complete search history.

(56) References Cited

U.S. PATENT DOCUMENTS

| | | | | |
|---|---|---|---|---|
| 5,802,051 A * | 9/1998 | Petersen et al. | ........ | 370/395.42 |
| 6,577,596 B1 * | 6/2003 | Olsson et al. | ........ | 370/230 |
| 6,687,250 B1 * | 2/2004 | Suzuki et al. | ........ | 370/395.65 |
| 6,876,669 B2 * | 4/2005 | Shalom | ........ | 370/468 |
| 7,046,665 B1 * | 5/2006 | Walrand et al. | ........ | 370/392 |
| 7,224,703 B2 * | 5/2007 | Antal et al. | ........ | 370/473 |

* cited by examiner

*Primary Examiner*—Jayanti K Patel
*Assistant Examiner*—Dargaye H Churnet
(74) *Attorney, Agent, or Firm*—Marger Johnson & McCollom, P.C.

(57) ABSTRACT

A network router where fragmentation takes place prior to the queuing. After packets are classified, the low priority packets are fragmented and AAL5 and MLPPP encapsulated. The fragments and the high priority packets are PPP encapsulated. Next the packets are queued using an MDRR queuing. All fragments for each packets are placed in the same queue. At the output of the queue, sequence numbers are added to the fragments of each packet. Finally the packets are queued for transmission.

24 Claims, 6 Drawing Sheets

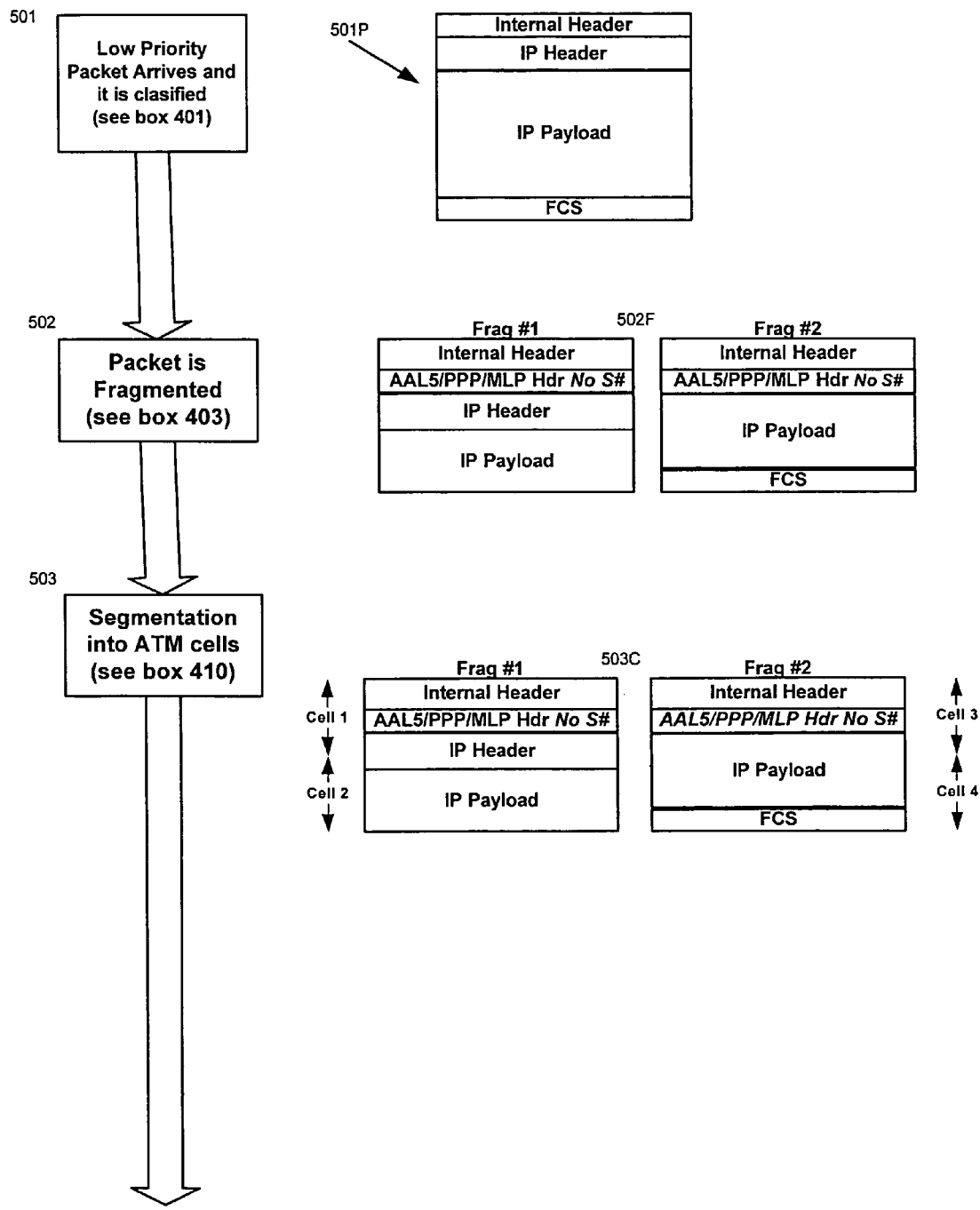

LINK FRAGMENT INTERLEAVING WITH FRAGMENTATION PRECEDING QUEUING

FIELD OF THE INVENTION

The present invention relates to communication networks and more particularly to packet networks and to network routers.

BACKGROUND OF THE INVENTION

Link Fragment Interleaving (LFI) is a well known technology that is widely used in packet network routers. LFI is used to reduce delay and jitter by fragmenting large frames and prioritizing small frames.

The manner that LFI interleaves packets is illustrated in FIG. 1A. FIG. 1A shown a stream of interleaved packets. One stream of packets consists of packets A1, A2, and A3. A second stream of packets includes packets B1, B2 and B3. If packet B1 is transmitted after the transmission of packet A1, the delay would be too large.

Packet A1 is therefore broken into five segments A1$a$, A1$b$, A1$c$, A1$d$ and A1$e$. Packets A2 and A3 are likewise broken into segments. Packet B1 is transmitted after segment A1$a$ as shown in FIG. 1B. The other segments are also interleaved as shown. Existing commercially available network routers implement LFI to reduce delay and jitter in high priority data streams.

A Point-to-Point Protocol (PPP) is defined in the publicly available document entitled "RFC1661". PPP is a widely used protocol that provides a set of rules for exchanging packets over a network. PPP provides a more stable transmission mechanism than that provided by older protocols. PPP also provides error checking features.

Multilink PPP (MLPPP) is a protocol that is defined in the publicly available document entailed "RFC1990". MLPPP is a method of splitting, recombining, and sequencing packets across multiple logical data links. MLPPP is widely used in commercially available data routers. MLPPP provides a technique for multilink encapsulating and fragmenting packets to reduce delay. It is noted that real time packets are not encapsulated. Instead, real time packets are sent as raw PPP packets. The real time packets are interleaved between fragments as shown in FIG. 1B.

Present MLPPP devices, queue low priority packets prior to fragmentation as shown in FIG. 2. The queuing 201 can for example be based upon packet class specifications. As illustrated in FIG. 2, high priority packets are queued separately and they by-pass the fragmentation mechanism 202. After fragmentation the packets are encapsulated with a PPP header at 203 and passed to FIFO buffer 204 for subsequent transmission.

SUMMARY OF THE PRESENT INVENTION

The present invention provides a system wherein the fragmentation of packets takes place prior to the queuing of packets. With the present invention after packets are classified, the low priority packets are fragmented. The fragments and the high priority packets are then PPP encapsulated. Next the packets are queued using an MDRR queuing. From the queue the packets are scheduled for transmission and at this point the sequence numbers are added. Finally the packets are transmitted.

BRIEF DESCRIPTION OF THE DRAWINGS

FIGS. 5A and 5B show the packets in various stages shown in FIG. 4.

DETAILED DESCRIPTION

Figure 1:
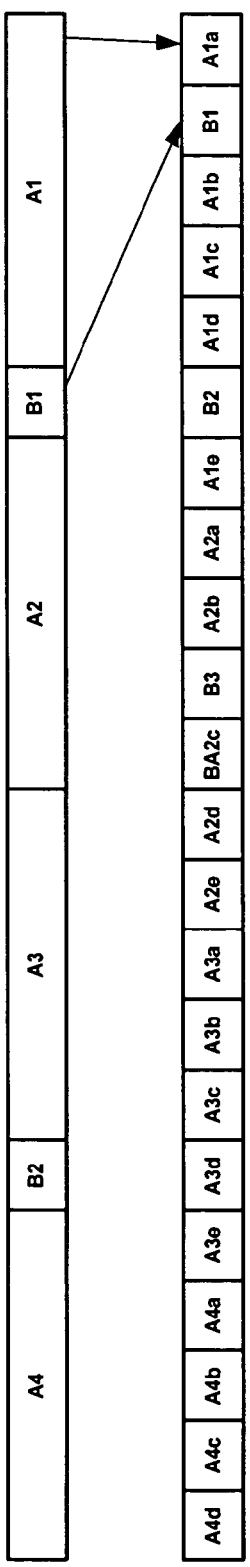
FIG. 1 shows packet interleaving in accordance with the prior art.
Figure 2:
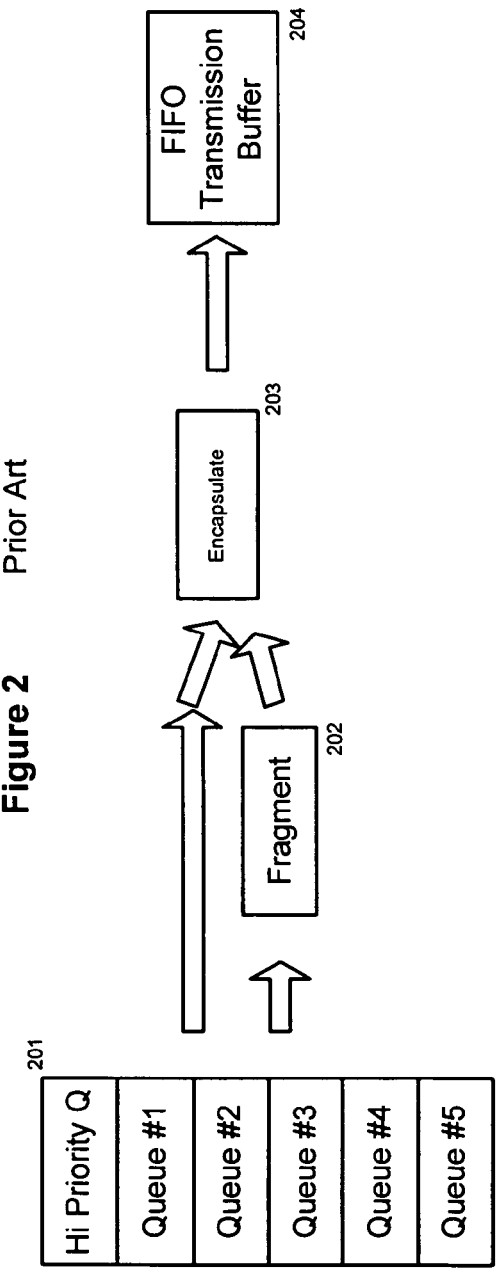
FIG. 2 shows prior art fragmentation and sequencing after queuing

The abbreviations listed below will be used in the following description. These are standard terms widely used in the art and in general they have the following meanings as they are used herein:

ATM means Asynchronous Transfer Mode. ATM is a widely used cell switching network standard. ATM is high-performance, full duplex, cell-oriented switching and multiplexing technology that utilizes fixed-length packets to carry different types of traffic.

ITU-T is a body that publishes standards applicable to packet communication networks. It is one of the three sectors of the International Telecommunication Union (ITU).

AAL means an ATM Adaptation Layer: AAL is a standard layer that divides the user information into segments suitable for packaging into a series of ATM cells. That is, AAL is a standard protocol that translates higher layer services into the size and format of an ATM cell. AAL allows multiple applications to have data converted to and from the ATM cell.

AAL5 is a low-overhead ATM adaptation layer for protocols such as Frame Relay and multi-protocol LAN packets. AAL5 is one of four AALs recommended by the ITU-T. AAL5 supports connection-oriented, variable bit rate services, and it is widely used to transfer of classic IP over ATM networks.

RED means Random Early Detection. RED uses an algorithm to randomly discard packets. When packets are dropped the source detects the dropped traffic and slows its transmission.

WRED means Weighted Random Early Detection. WRED combines the capabilities of the RED algorithm with IP precedence. This combination provides preferential traffic handling for higher-priority packets. WRED can selectively discard lower-priority traffic when the interface starts to get congested and it can provide differentiated performance characteristics for different classes of service.

LFI means Link Fragment and Interleaving. LFI is a well known technology that is widely used in packet network routers.

PPP means Point-to-Point Protocol. PPP is a widely used protocol that provides a set of rules for exchanging packets over a network. PPP provides a more stable transmission mechanism than that provided by older protocols. PPP also provides error checking features. The PPP protocol is defined in the publicly available document entitled "RFC1661".

MLPPP means the protocol sometimes referred to as Multilink PPP. MLPPP is a known method of splitting, recombining, and sequencing packets across multiple logical data links. The MLPPP protocol is defined in the publicly available document entitled "RFC1990".

MLP is a shortened name for the MLPPP protocol.

MDDR means Modified Deficit Round Robin and it is a know technique. With MDRR non-empty queues are served one after the other, in a round-robin fashion. Each time a queue is served, a fixed amount of data is dequeued. The algorithm then services the next queue. When a queue is served, MDRR keeps track of the number of bytes of data that was dequeued in excess of the configured value. In the next pass, when the queue is served again, less data will be dequeued to compensate for the excess data that was served previously. As a result, the average amount of data dequeued per queue will be close to the configured value. In addition, MDRR maintains a priority queue that gets served on a preferential basis.

SAR means Segmentation and Reassembly. SAR generally refers to breaking an arbitrary size packet into smaller pieces at the transmitter. This is generally done because of restrictions in the communications channel or to reduce latency. The pieces are joined back together in the right order at the receiver ("reassembly").

FPGA means Field Programmable Gate Array. FPGA are programmable hardware devices that can perform logical operations.

GCRA means the Generic Cell Rate Algorithm. A known algorithm for controlling traffic flow. The input can be in bursts and the output rate will be smooth. CGR also provides traffic policing to insure that traffic is within specified limits.

The preferred embodiment of the invention functions as an ATM router. Packets are fragmented and encapsulated into ATM cells. The cells are queued. When the cells exit the queue, and prior to transmission, the fragment sequence numbers are added. Important points that should be noted and that the fragmentation is performed prior to the queuing, and sequence numbers are added after queuing.

Figure 3:
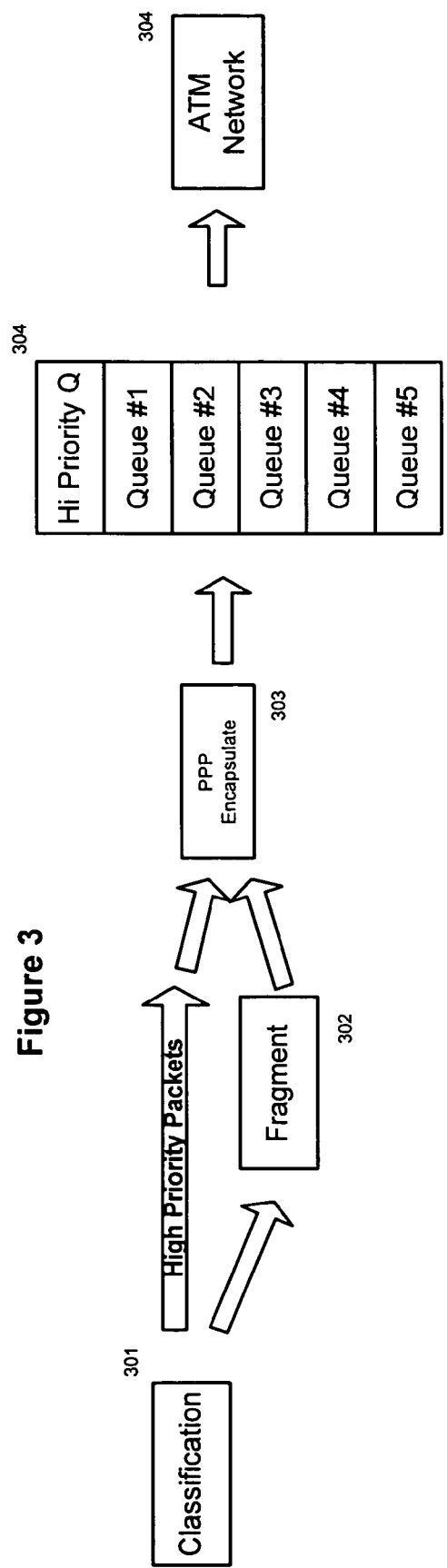
FIG. 3 shows queuing after fragmentation and sequencing in accordance with an embodiment of the present invention.

The overall operation of the preferred embodiment of the invention is shown in FIG. 3. As shown in FIG. 3, there are five main operations. There is classification 301, fragmentation 302, PPP encapsulation 303, Queuing 304 and finally the packets are passed to an ATM network 304.

The classification unit 301 classifies packets in accordance with prior art classification techniques. High priority packets are identified and packets are classified into a number of groups or classes. Classification is done using a set of rules that specify how packets should be classified based upon information in the packet header. There are a wide variety of know packet classification techniques such as Recursive Flow Classification (RFC), Hierarchical Intelligent Cutting (Hi-Cuts) and Agregated Bit Vector (ABV.

The high priority packets are passed directly to the PPP encapsulation unit 303. The low priority packets are fragmented and a conventional MLP header is added to each fragment. This header is similar to that used in the prior art MLP devices; however, the sequence number is added in a different manner from how sequence numbers are added in the prior art. This is explained below. At the point where the packet is divided into fragments, the sequence numbers are all set to "0". In effect, no sequence numbers are added to the fragments.

After encapsulation the packets are queued and then passed to the ATM network using MDRR queuing. As is conventional with a MDRR queuing strategy, non-empty queues are served one after the other, in a round-robin fashion. In addition, MDRR maintains a priority queue that gets served on a preferential basis. Alternate embodiments utilize other techniques for scheduling packets such as the techniques known as Weighted Round Robin (WRR), Weighted Fair Queuing (WFQ) or Round Robin (RR), etc.

Fragments from different low priority packets are not interleaved in the queue. Sequence number are added to the fragments at the point where the packets exit from the queue.

It is important to note that the low priority packets are fragmented prior to being queued. Fragments from different packets are not interleaved in the queue, and sequence numbers are only added to the fragments at the point where they exit from the queue.

The following is an explanation of why the present system assigns sequence numbers only after the packets have been queued. Where fragmentation precedes queuing, the unit that adds the MLPPP header can not set the sequence numbers since it does not know the order that packets will be transmitted. The packet order may change due to the queuing. Furthermore, some fragments may be dropped due to the WRED drop policies. With in the present embodiment, the time that particular fragments and packet are transmitted is only determined by the Quality of Service (QOS) policies implements by the queuing unit. At the output of the queuing device, a record is maintained of the sequence numbers per channel. Sequence numbers are inserted into the MLPPP header after the queuing and scheduling processes take place. The queuing device is packet aware rather than fragment aware and it does not interleave fragments from different packets.

Figure 4:
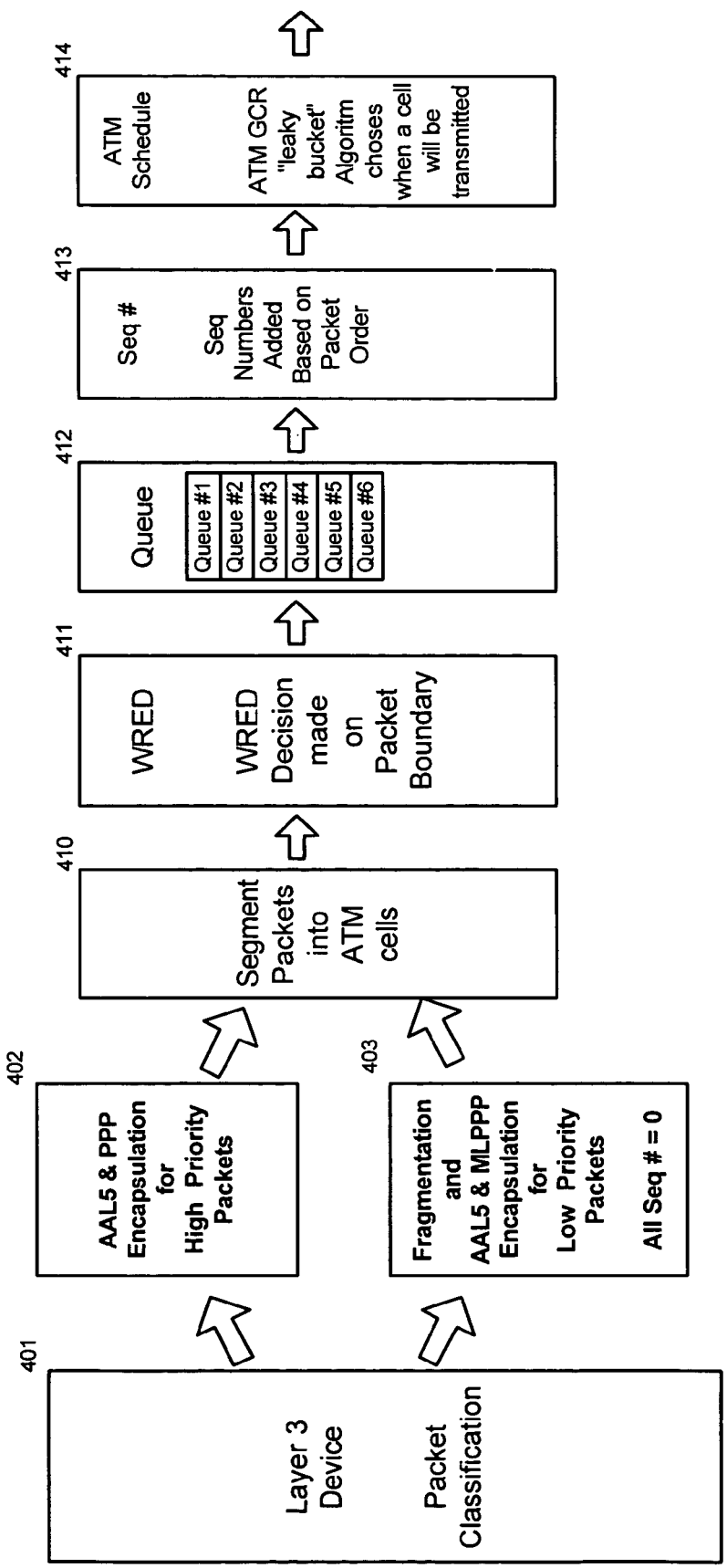
FIG. 4 a block diagram of a first embodiment of the present invention.
Figure 5B:
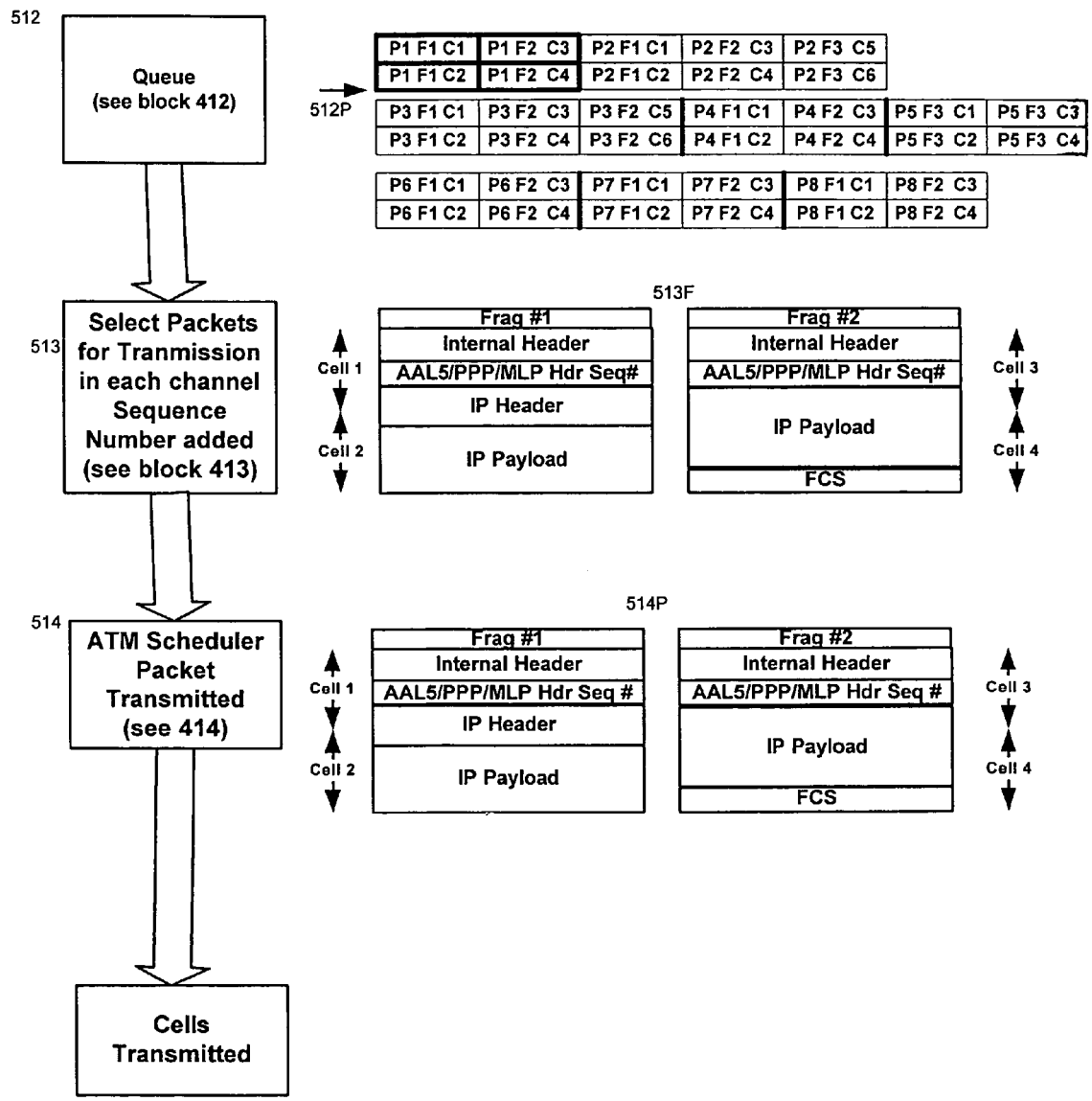

FIG. 4 is a block diagram of an implementation of a preferred embodiment. The packets at each stage of the system are shown in FIGS. 5A and 5B. In the implementation shown in FIG. 4, the LFI functionality is distributed between several components. However, fragments from different low priority packets are not interleaved, and sequence numbers are added to the fragment after the packets are queued. The WRED is fragment aware and WRED rules are applied only to the first fragment of any packet. Once a 'drop' decision is taken, all following fragments of that packet are dropped.

As illustrated in FIG. 4, the input unit 401 receives packets from a conventional router or from some other layer 3 device. Packets are classified in a conventional manner. High priority packets are sent to unit 402 for encapsulation and low priority packets are sent to unit 403 for fragmentation and encapsulation.

Unit 402 maps higher layer user data into PPP packets, making the data suitable for transport through the ATM network. Unit 402 applies AAL5 and PPP encapsulation to the high priority packets. The mapping is done using conventional AAL5 mapping and PPP encapsulation techniques.

The lower priority packets are fragmented by unit 403. The fragments are AAL5 and MLPPP encapsulated. However, an important point is that unit 403 sets all the sequence numbers of the fragments to 0. Thus, in effect, no sequence numbers are added.

In unit 410 the segments are packets into ATM cells. This can be done in accordance with the well known procedure for creating ATM cells.

The ATM cells are next queued by units 411 and 412 using the WRED protocol. The WRED decisions are made on packet boundaries. At the output of the queues, unit 413 adds sequence numbers to the MLPPP packets.

Finally unit 414 schedules the packets for transmission on the ATM network. The scheduling is done using an algorithm such as the well known ATM GCRA "leaky bucket" algorithm or some other scheduling algorithm. Unit 414 decides when cells will be transmitted out over the network.

It is important to note that when the packets reach units 410 to 414, the low priority packets have been divided into multiple fragments. The queuing decision and the WRED decisions are taken on packet boundaries.

In this embodiment units 402 and 403 are hardware units that can be constructed from FPGAs. The units 410, 411, 412, 413 and 414 shown in FIG. 4 represent operations performed by a programmed computer. The units shown in effect represent program subroutines. Units 410 and 414 is in effect a SAR device that performs the operation shown under program control.

FIGS. 5A and 5B show the configuration of the packets at various stages in the system shown in FIG. 4. FIG. 5A begins with a low priority packet 501P arriving and being classified as a low priority packet by unit 401. As is conventional, packet 501P includes an Internal Header, an IP header, and IP payload and a Frame Check Sequence (FCS).

As indicated by box 502, low priority packets are directed to unit 403 for fragmentation and encapsulation. Boxes 502F show the packet fragments. Two fragments are shown; however, it should be understood that there may be any number of fragments as is normal in LFI systems. As is conventional, each fragment includes an Internal Header, and an AAL5/PPP/MLP header. An important point is the AAL5/PPP/MLP header does not include a valid sequence number. The sequence number is set to 0. In the figures a sequence number of 0 is represented by the words "No seq#".

Next as indicated by block 503, unit 410 segments the fragments into cells. It should be noted that in the example given there would be four ATM cells. Naturally if there were more fragments, there would be more cells. At this point the fragments are merely divided into cells. No additional headers are added.

The process continues in FIG. 5B where as indicated by block 512, the cells are queued by unit 412. Representative queues are indicated by boxes 512Q. In the figure each ATM cell has three designations. For example the first cell contains the designation "P1 F1 C1". The letters have the meanings as explained for the following examples:

P1 F1 C1 means: packet 1, fragment 1, and cell 1.

P3 F2 C3 means: packet 3, fragment 2, and cell 3.

Naturally, it should be understood that the queues shown are merely an example. The actual queues at any particular time will depend upon the packets and fragments received and transmitted at that particular time. The representative queues shown include cells from eight different packets. Some of the packets were broken into more than two fragments. As shown, all fragments from each packet are in the same queue.

Packets are selected for transmission out of the queues in accordance with the techniques know in the art. However, at the exit of the queue, unit 413 adds sequence numbers to the fragments. It is noted that in FIG. 5B, at the end of the AAL5/PPP/MLP Header, the designation "No S#" has been changed to "Seq#". This change is intended to indicate that a sequence number has now been added to the AAL5/PPP/MLP Header in each fragment.

Finally as indicated by block 514, the ATM scheduler schedules the packets for transmission. This scheduling is done in accordance with the techniques known in the prior art.

Figure 6:
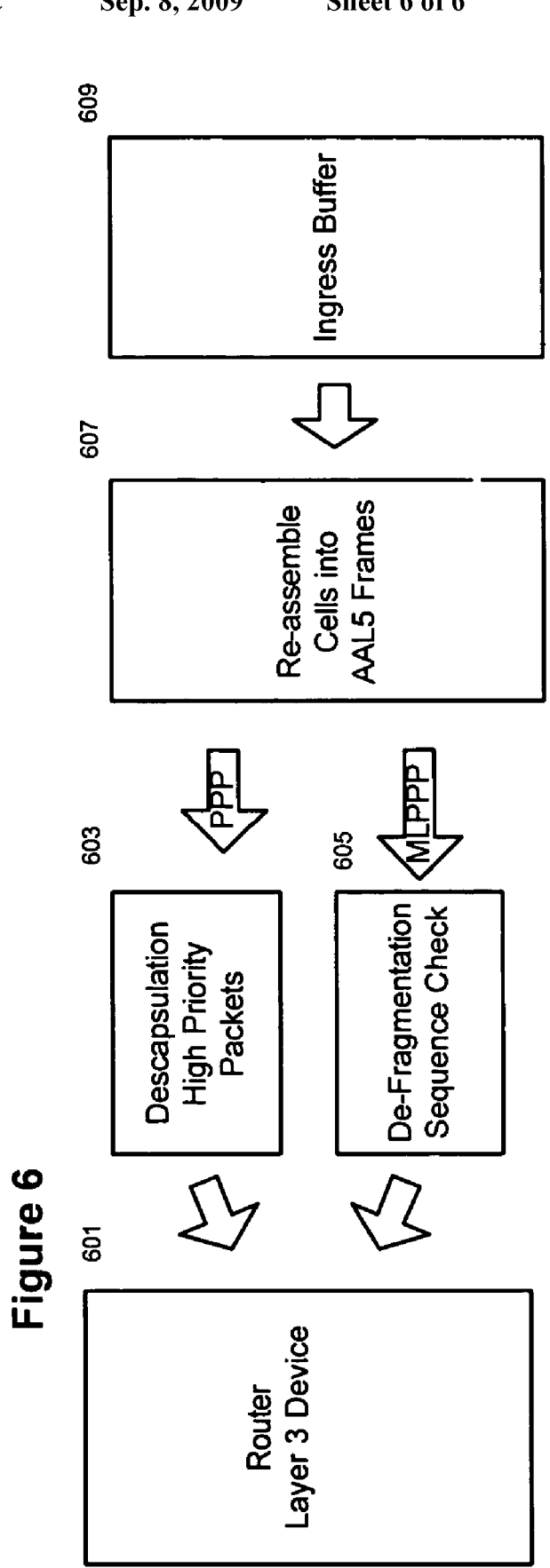
FIG. 6 shows a block diagram of the receiving end of the first embodiment.

The receiving end of the network is illustrated in FIG. 6. At the receiving end of a transmission, the MLPPP protocol relies upon the sequence numbers to adjust out of order packets. The sequence numbers are transmitted in ascending order on each one of the bundled lines. That is, on each virtual circuit in the case of an ATM system.

Transmitting the fragments in an order that corresponds to the sequence numbers in the MLPPP header is very important, since out of order fragments, may be dropped by the LFI at the receiving end.

As shown in FIG. 6 after packets are received at the ingress buffer 509 they are re-assembled into AAL5 frames by unit 607. This is conventional technology.

The high priority PPP packets are de-capsulated by unit 603 and the low priority fragmented packets are de-fragmented and sequence checked by unit 605. These operations take place using standard protocol techniques.

From units 603 and 604, the packets are sent to a conventional layer 3 router 601.

While the invention has been shown and described with respect to preferred embodiments thereof, it should be understood that various changes in form and detail can be made without departing from the sprit and scope of the invention. The scope of the invention is limited only by the appended claims.

We claim:

1. A method of encapsulating packets for transmission on a Asynchronous Transfer Mode (ATM) network, said method including the steps of:
   first, classifying the packets into classes that include a high priority class and other classes,
   second, encapsulating the high priority packets, and fragmenting and encapsulating the low priority packets,
   third, segmenting the encapsulated packets into ATM cells,
   fourth, queuing the packets, and making Weighted Random Early Detection (WRED) decisions, said queuing and WRED decisions being made on packet boundaries,
   fifth, adding sequence numbers to the packets based upon packet order in each fragment and queue, and
   sixth, ATM scheduling and transmitting the packets,
   whereby the fragmentation and encapsulation precedes the queuing, and
   whereby the queuing of the packets precedes the addition of sequence numbers to the packets.

2. The method recited in claim 1 wherein the high priority packets are encapsulated in accordance with the ATM Adaption Layer 5 (AAL5) and Point-to-point (PPP) standard protocols.

3. The method recited in claim 1 wherein the low priority packets are encapsulated in accordance with the ATM Adaption Layer 5 (AAL5) and Multilink Point-to Point (MLPPP) standard protocols.

4. The method recited in claim 1 wherein the fragments of low priority packets are initially encapsulated with sequence numbers set to zero.

5. The method recited in claim 4 wherein said sequence numbers are reset to reflect the sequence of segments after said packets are queued.

6. An Asynchronous Transfer Mode (ATM) packet router including,
   means for classifying the packets into classes that include a high priority class and other classes,
   means for encapsulating the high priority packets, and fragmenting and encapsulating the low priority packets,
   means for segmenting the encapsulated packets into ATM cells,
   means for queuing the packets, and making Weighted Random Early Detection (WRED) decisions on packet boundaries,
   means for adding sequence numbers to the packets based upon packet order in each fragment and queue, and means for ATM scheduling and transmitting the packets,
said means for fragmentation and encapsulation operating on said packets prior to said means for queuing the packets, and
said means for adding sequence numbers to the packets operating on said rackets after said means for queuing the packets.

7. The router recited in claim 6 wherein the high priority packets are encapsulated in accordance with the ATM Adaption Layer 5 (AAL5) and Point-to-Point (PPP) standard protocols.

8. The router recited in claim 6 wherein the low priority packets are encapsulated in accordance with the ATM Adaption Layer 5 (AAL5) and Multilink Point-to-Point (MPPP) standard protocols.

9. A system for routing packets comprising,
a unit for receiving and classifying packets into high priority and low priority packets,
a first encapsulation unit which Asynchronous Transfer Mode (ATM) Adaption Layer (AAL) and Point-to-Point (PPP) encapsulates the high priority packets,
a second encapsulation unit which fragments and AAL and Multilink Point-to-Point (MLPPP) encapsulates the low priority packets,
a unit for dividing the encapsulated packets into ATM cells,
a unit for making Weighted Random Early Detection (WRED) decisions on packet boundaries and dropping all fragments if the first fragment of a packet is dropped,
a unit for queuing the packets, all fragments of each packets being queued together,
a unit for adding sequence numbers to the fragments at the exit of said queues, and
a unit for ATM scheduling said packets.

10. The system recited in claim 9 wherein said second encapsulation unit sets all the fragmentation sequence numbers to 0.

11. The system recited in claim 9 wherein first and second encapsulating units are formed from Field Programmable Gate Arrays (FPGAs).

12. A method of receiving packets and for transmitting said packets on an Asynchronous Transfer Mode (ATM) network that comprises the steps of:
first, classifying the packets that are received into high and low priority packets,
second, fragmenting the low priority packets,
third, encapsulating the said high priority packets and said fragments of said low priority packets,
fourth, queuing said packets, all fragments of each packets being placed in the same queue,
fifth, adding sequence numbers to said fragments after queuing said packets and prior to transmission, and,
sixth, scheduling and transmitting said packets on said ATM network.

13. The method recited in claim 12 wherein said low priority packets are encapsulation is done by a device consisting of Field Programmable Gate Arrays (FPGAs).

14. The method of claim 12 wherein said high priority packets are Point-to-Point (PPP) encapsulated.

15. The method of claim 12 wherein said fragments are Multilink Point-to-Point (MLPPP) encapsulated.

16. The method of claim 12 wherein all fragments are given a sequence number of zero in step 3 of said method.

17. A method of routing packets including the steps of:
classifying said packets into high priority packets and low priority packets,
ATM Adaptation Layer (AAL) encapsulating said high priority packets,
fragmenting said low level packets,
AAL and Multilink Point-to-Point (MLPPP) encapsulating said fragments,
segmenting said encapsulated packets and cells into ATM cells,
queuing said cells, all cells of each packet being queued in the same queue,
scheduling the cells of each packet for transmission,
adding sequence numbers to said fragments after queuing the cells of each packet and prior to transmission, and
transmitting said cells.

18. The method of claim 17 wherein said packets are AAL 5 encapsulated.

19. The method of claim 17 including applying Weighted Random Early Detection (WRED) to said cells prior to queuing.

20. The method of 19 wherein said WRED discards all fragments of a packet, if the first fragment is discarded.

21. The method of claim 19 wherein said WRED decisions are made on packet boundaries.

22. A computer readable medium containing instructions which, when executed by a computer, cause the instructions to route packets by:
classifying said packets into high priority packets and low priority packets,
Asynchronous Transfer Mode Adaptation Layer (AAL) encapsulating said high priority packets,
fragmenting said low level packets,
AAL and Multilink Point-to-Point (MLPPP) encapsulating said fragments,
segmenting said encapsulated packets and cells into Asynchronous Transfer Mode (ATM) cells,
queuing said cells, all cells of each packet being queued in the same queue,
scheduling the cells of each packet for transmission,
adding sequence numbers to said fragments after queuing the cells of each packet and prior to transmission, and
transmitting said cells.

23. The computer readable medium of claim 22 wherein said packets are AAL 5 encapsulated.

24. The computer readable medium of claim 22 wherein Weighted Random Early Detection (WRED) is applied to said cells prior to queuing.

* * * * *

UNITED STATES PATENT AND TRADEMARK OFFICE
CERTIFICATE OF CORRECTION

PATENT NO. : 7,586,918 B2  Page 1 of 1
APPLICATION NO. : 10/948370
DATED : September 8, 2009
INVENTOR(S) : Amir Levy et al.

It is certified that error appears in the above-identified patent and that said Letters Patent is hereby corrected as shown below:

Column 7, line 6, the word "rackets" should read -- packets --.

Signed and Sealed this

Tenth Day of November, 2009

David J. Kappos
*Director of the United States Patent and Trademark Office*